United States Patent [19]
Brisby

[11] Patent Number: 5,606,934
[45] Date of Patent: Mar. 4, 1997

[54] ANIMAL FEEDING APPARATUS

[76] Inventor: Ian Brisby, Musley Bank House, Malton, North Yorkshire, United Kingdom, Y017 0TD

[21] Appl. No.: 331,667
[22] PCT Filed: May 24, 1993
[86] PCT No.: PCT/GB93/01062
 § 371 Date: Nov. 8, 1994
 § 102(e) Date: Nov. 8, 1994
[87] PCT Pub. No.: WO93/23991
 PCT Pub. Date: Dec. 9, 1993

[30] Foreign Application Priority Data

May 23, 1992 [GB] United Kingdom ............... 9211076
Jan. 27, 1993 [GB] United Kingdom ............... 9301607

[51] Int. Cl.$^6$ ............................................. A01K 7/06
[52] U.S. Cl. ............................... 119/53.5; 119/51.5
[58] Field of Search .......................... 119/51.5, 53.5, 119/54, 902

[56] References Cited

U.S. PATENT DOCUMENTS

| | | | |
|---|---|---|---|
| 1,199,655 | 9/1916 | Battle | 119/54 |
| 1,240,437 | 9/1917 | Gore et al. | 119/53.5 |
| 1,309,090 | 7/1919 | Henson | 119/54 |
| 1,818,419 | 5/1930 | Miller | 119/902 X |
| 3,741,162 | 6/1973 | Lopez | 119/51.5 X |
| 4,729,344 | 3/1988 | Winkel | 119/902 X |
| 4,895,109 | 1/1990 | De Groot et al. | 119/51.5 |
| 5,044,318 | 9/1991 | Sutton et al. | 119/902 X |
| 5,085,173 | 2/1992 | Powers . | |

FOREIGN PATENT DOCUMENTS

| | | |
|---|---|---|
| 59908/73 | 9/1972 | Australia . |
| 0044465A2 | 1/1982 | European Pat. Off. . |
| 0399305A1 | 5/1990 | European Pat. Off. . |
| 0482719A1 | 4/1992 | European Pat. Off. . |
| 779787 | 4/1935 | France . |
| 2561067A1 | 3/1984 | France . |
| 2563078A1 | 4/1984 | France . |
| 2652788A1 | 5/1978 | Germany . |
| 1001801A6 | 3/1990 | Germany . |
| 278490 | 1/1952 | Switzerland . |

*Primary Examiner*—Robert P. Swiatek
*Assistant Examiner*—Yvonne R. Abbott
*Attorney, Agent, or Firm*—Zarley, Mckee, Thomte, Voorhees, & Sease

[57] ABSTRACT

A pig feeder wherein the pigs feed from opposite side of a firmly fixed feed tray. The feed tray is fed with feed from an overhead hopper firmly fixed by means of a frame having two legs only which lie in diametrically opposite positions relative to the tray, and from the hopper there is a feed passage through which the feed passes to an outlet over the tray. In the feed passage is positioned a dispensing mechanism which is operated by a bar member which is moved by the feeding pigs. The feed falls from the outlet into the tray and the arrangement is that there is sufficient unobstructed clearance under the outlet to enable the pigs, which are aggressive animals, to compete vigorously with each other for the feed which falls on to the tray as the pigs can reach across the tray under the outlet.

13 Claims, 4 Drawing Sheets

ANIMAL FEEDING APPARATUS

This invention relates to animal feeders, and is in particular but not exclusively related to animal feeders for the feeding of pigs.

In the commercial farming of pigs, the achievement of high growth rates at an economical cost is considered paramount. The cost and effect on growth of feedstuff, which must contain a mixture of dietary components to ensure healthy and vigorous growth, is such that an improvement in the means of supply of feedstuff can have considerable effect on overall cost of production.

In one stage of the rearing of pigs, termed the- growing stage, the pigs are provided with an unlimited supply of feed, the objective being to encourage the pigs to eat as much as possible, and at this stage considerable wastage of feed occurs in using for example filled feeding troughs, as much feed is rooted out of such a trough, and stale feed goes uneaten.

Self-feeders for livestock are well known in the art. In U.S. Pat. No. 1,695,597 a feeder includes a feed agitator with a chain having spaced bars thereon which is agitated by a hog. U.S. Pat. No. 2,153,455 discloses a feed hopper and a spoked wheel which are both rotatable with respect to a shaft mounted with agitators. Bars are arranged peripherally around the top of the wheel and extend to the hopper to define compartments. U.S. Pat. No. 3,951,107 on the other hand illustrates a linear type livestock feeder with a front partition adapted for agitating feed when abutted by an animal.

European Patent Application No. 0,044,465 relates to a rotary self-feeder, wherein a feed wheel is movable by livestock to dispense feed to the outer periphery of a feed trough. The feed wheel increasingly resists movement in response to increasing quantities of feed on the trough, thereby reducing wastage.

Apparatus used for the provision of unlimited supplies of feed now includes the single space feeder. In this feeder, a supply of feed is provided in a framework so that the feed is accessible by one animal only, and commonly the animal must operate a dispensing mechanism to cause feed to fall into a trough, wherefrom the pig feeds. Wastage is limited, in that feed is provided only when the pig desires to eat and operates the dispensing mechanism. It is commonly believed at present that single-space feeders are the most effective means of supply of feedstuff to growing pigs.

It has however been discovered by the Applicant that such single space feeders are not the most effective apparatus for the encouragement of feeding for growth. In particular, a pig feeding in a single space feeder, having the entire feed supply at its disposal, has no incentive to feed vigorously. The Applicants have found that competitive feeding, where more than one pig has access to an animal-operated feed supply and pigs compete for the same portions of feed, gives a greater rate of feeding leading to enhanced growth rates. A study of growth rates has shown that a feeder according to the present invention can give a 12.7% improvement in growth rate over the single-space feeder, which translates into a considerable cost advantage.

It is an object of the present invention to provide an animal feeding apparatus whereby an element of competition for feed is introduced by providing limited amounts of feedstuff which each feeding animal is presented with an equal opportunity to consume. The invention also seeks to provide feed in such a manner effectively without wastage by inhibiting the rooting out of feed from the apparatus.

It will be appreciated that a large number of feeding apparati will be utilised on a commercial farm, and therefore the feeders used must be of low cost, as any cost element introduced by such equipment will be reflected in the final cost of the product. It is a further object of the invention to provide feed apparatus at low cost.

Other factors at play in the feeding equation include the freshness and moisture content of the feed provided, and the invention seeks to provide apparatus whereby feed is provided at optimum levels of freshness and moisture content.

According to the present invention, there is provided a feeding apparatus for animals comprising an upright feed passage having a lower end outlet, a feed tray located to receive feedstuff falling from said outlet, a feedstuff dispensing mechanism responsive to animal operation to dispense feedstuff from the passage onto the feed tray, and a frame which supports the upright passage to enable a number of animals radially arranged around the tray to feed simultaneously, the passage being positioned in relation to the feed tray so that feedstuff is dispensed into the centre of the feed tray, characterised in that the apparatus provides a competitive feeder by having the outlet located above the centre of the feed tray sufficiently to enable any animal at the feeder to feed from under the outlet and also to reach across the feeding tray into the opposite side of the tray.

The feed collection means is preferably a circular bowl, whose base is preferably flat and undivided, this arrangement providing most beneficial access to the dispensed feedstuff. The frame is suitably of a generally planar construction, and preferably the frame is arranged in relation to the collection means so that the area immediately above the collection means is obstructed, thereby inhibiting rooting out of feed from the collection means. If one or more pigs are provided with a tray full of feedstuff, much of the feedstuff will be flicked or rooted out of the tray by the pigs snouts as they search for the freshest food. The invention seeks to eliminate such wastage by the use of an obstructing framework.

The obstructing framework preferably comprises check means located adjacent the said animal operation means. In particular the frame may comprise two supports-straddling the collection means and a cross bar, comprising check means being L-shaped bars each extensing between one of said supports and the cross bar.

The animal operation means may be one of a number of mechanisms, but will preferably comprise a rockable member adapted upon rocking to displace accummulated feedstuff from a shelf means in the passage over an edge of the shelf means to fall through the passage. The rockable member may include a vein located above the shelf, and the said shelf may suitably comprise a shallow V-sectioned plate having two opposite edges and the vein is rockable by the animal to displace feedstuff to opposite sides of the shelf and over the opposite edges. The feeder may include baffle means in the passage arranged to direct feedstuff passing through the passage onto the shelf. The feeder may also include lower baffle means in the passage below the shelf edges for deflecting feedstuff falling from such edges towards the centre of the passage to fall into the feed collection means.

The animal operation means preferably comprises an inverted U-shaped member of which the base passes through and is rockable relative to the passage and the arms hang freely outside the passage so as to be engageable by the animals.

For the provision of feed with optimum moisture content, the animal operation means is preferably adapted to operate a liquid supply means whereby a quantity of liquid to moisten the feedstuff is supplied to the feed collection means along with the feedstuff. This may take the form of a liquid feed pipe having an outlet above the feed collection means, said pipe embodying a valve operatively connected to said animal operation means to be operated thereby when the animal operator means is rocked by an animal.

The generally planar framework may divide the feed collection means in two, and in a further embodiment of the invention the means defining an upright feed passage might be a tube.

The feeding apparatus is preferably adapted for use by pigs. An embodiment of the invention will now be described, by way of example, with reference to the accompanying drawings.

Figure 1:
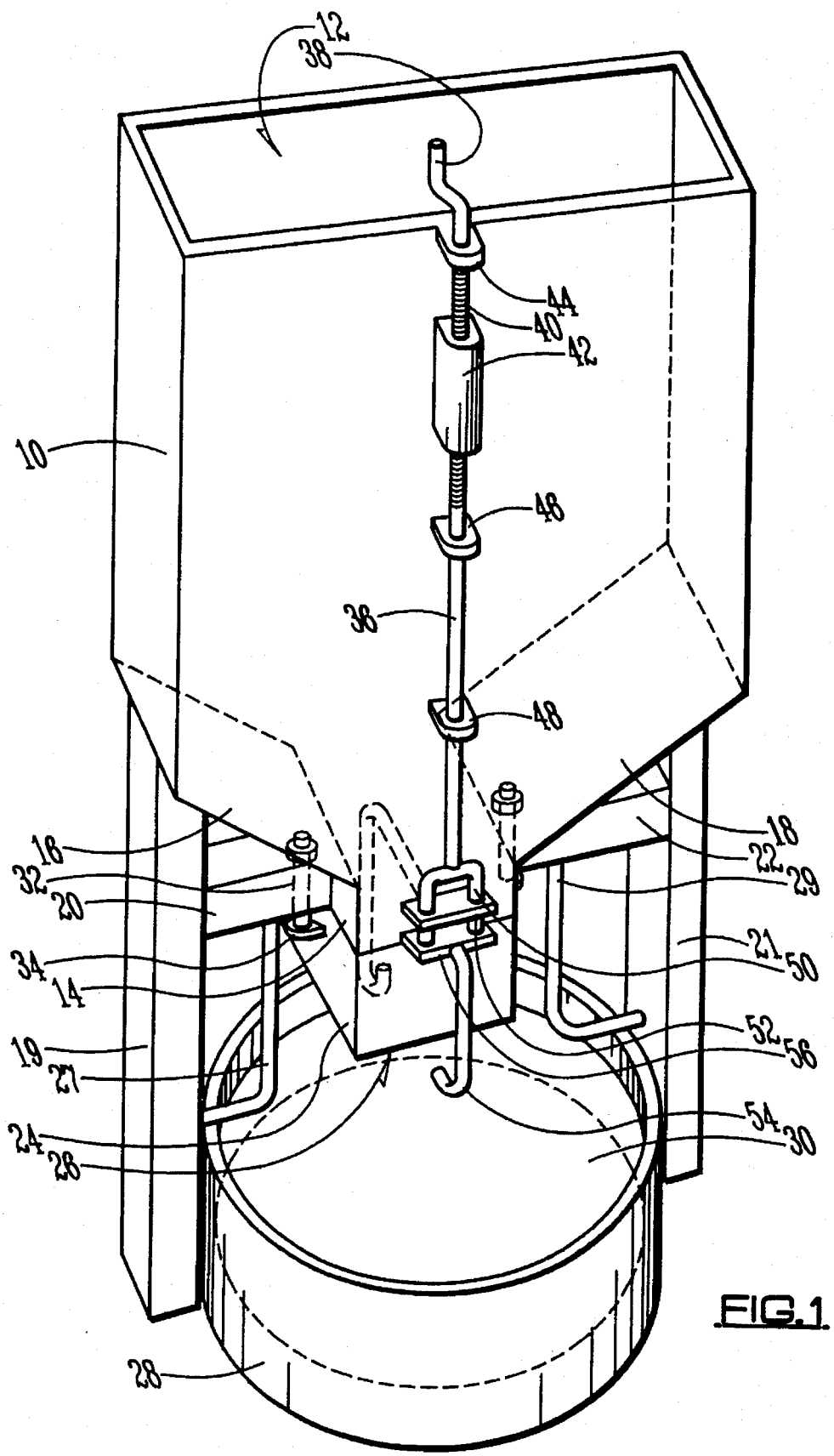
FIG. 1 is a perspective view of the feeder.

Referring to FIG. 1, the dibble feeder comprises a hopper 10 for the receipt in the open top end thereof of the particulate foodstuff as indicated by the arrow 12.

At the lower end, the hopper 10 narrows to an outlet section 14 by virtue of the hopper having tapering shoulders 16, 18.

Figure 2:
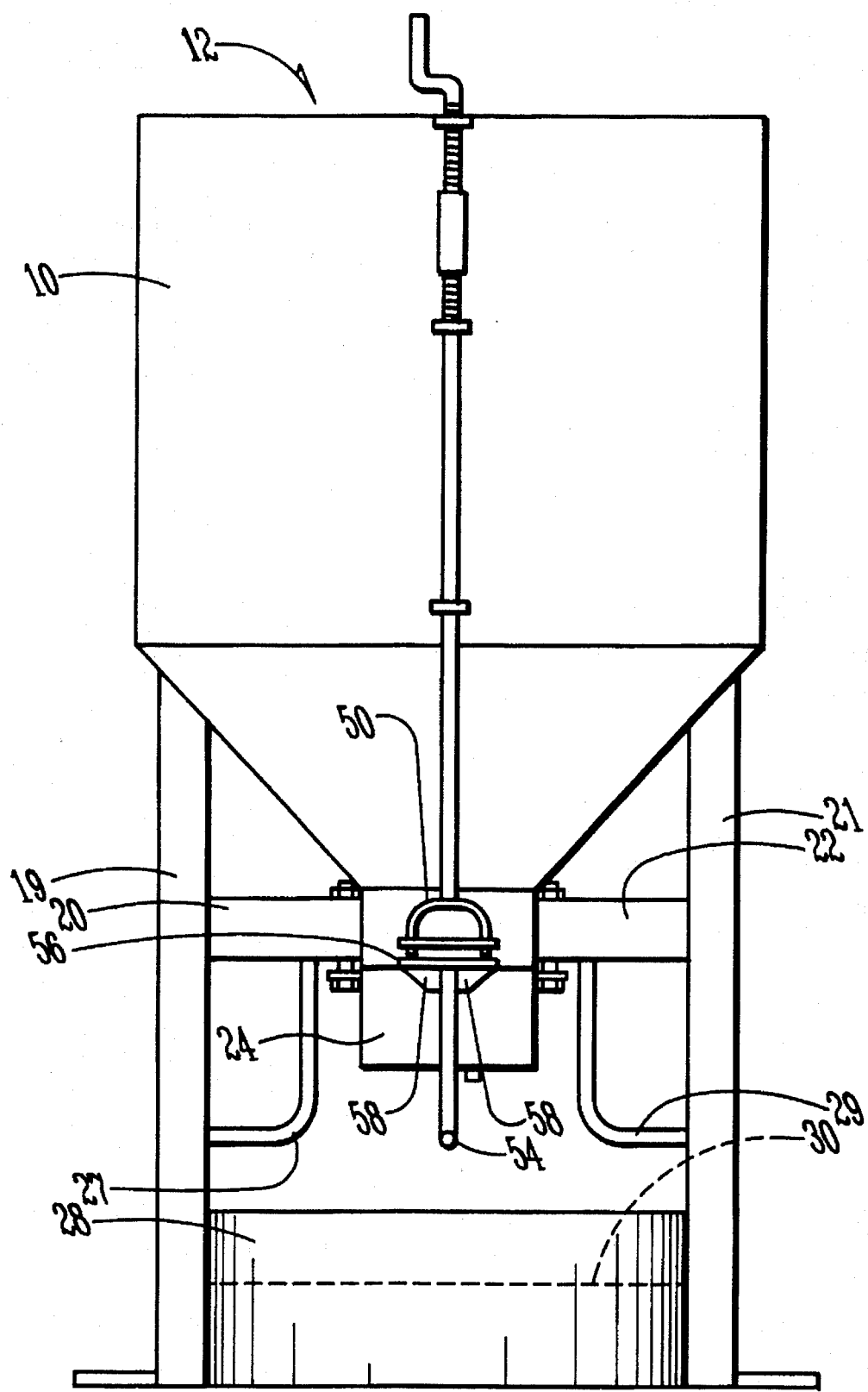
FIG. 2 is a side view of the feeder of FIG. 1.

The hopper 10 is mounted on a pair of vertical supports 19 and 21, and is further supported by a pair of cross bars 20 and 22 of a frame which is shown in FIG. 2, and an outlet duct section 24 is bolted to the lower end of the reduced section 14 and is of the same cross sectional shape as section 14 so that a continuous outlet passage leads from the larger portion of the hopper to a feedstuff outlet 26.

The outlet is disposed centrally above a feeding tray 28 which in the preferred embodiment shown is circular, and is large enough to enable a number of pigs to feed from the tray simultaneously. The feeding tray 28 has a raised flat base 30. The feeding bowl 28 is approximately 3 cm deep.

The outlet section 24 is bolted to the section 14 by means of bolts 32 which pass through the frame members 20 and also through lugs 34 which are fast with the outlet section 24.

L-shaped obstructor bars 27 and 29 extending between the vertical supports 19 and 21 and the cross bars 20 and 22 extend over the feeding tray 28 to restrict the space above. The distance between the feeding tray base 30 and the obstructor bars 27 and 29 and the dibble bar arms 60 is approximately 14 cm.

To the outside of one side of the hopper is provided an adjustment screw rod 36 having at the top end thereof a manually operable handle 38. The rod 36 is threaded in the region 40 and the threaded region 40 engages in a threaded boss 42 which is welded or otherwise secured to the hopper 10. As the rod 36 is rotated therefore by handle 38, it is caused to move up or down depending upon the direction of rotation. In this movement the rod is guided in guide lugs 44, 46 and 48 also secured to the hopper.

At the lower end the rod 36 carries rotatably a forked portion 50 of which the legs pass slidingly through apertures in a guide plate 52, and the ends of the legs form stops to limit the extent to which a dibble bar 54 can rock, as described hereinafter, about its axis. The rocking of the dibble bar is limited by means of a stop plate 56 which is secured to the dibble bar by being supported by flange plates 58 (see FIG. 2) which are welded to the plate 56 and also to the dibble bar 54.

The dibble bar 54 is of inverted U-shaped form, so that the downwardly depending legs 60 can be operated by the pigs 30 by rocking same which has the effect of causing dispensing of foodstuff from the outlet 26 into the tray 28.

Figure 3:
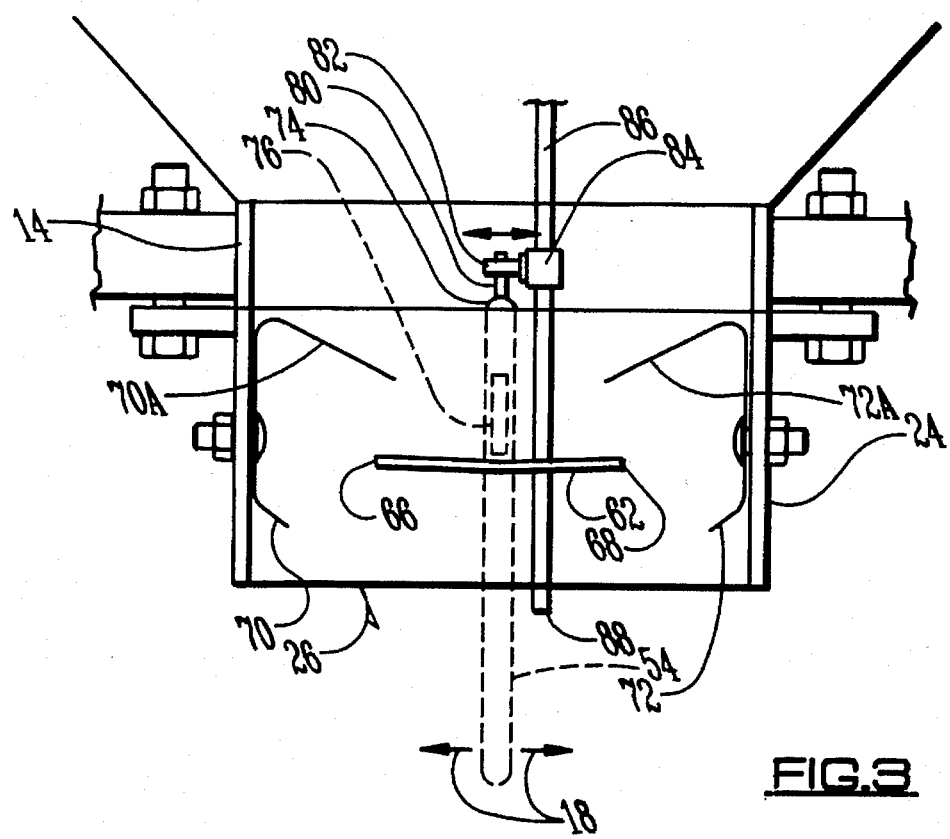
FIG. 3 is an enlarged sectional side view of a portion of the feeder shown in FIG. 2.
Figure 4:
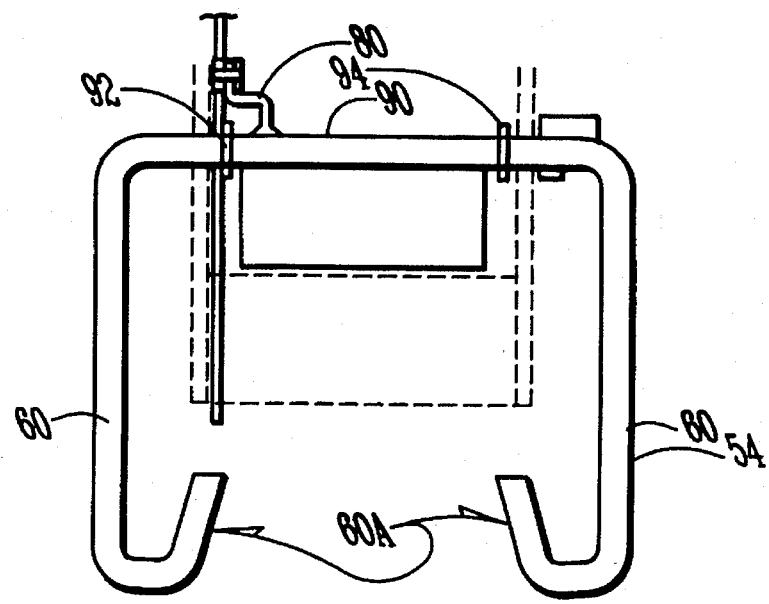
FIG. 4 is a sectional end view of the portion of the feeder shown in FIG. 3.

For a better understanding of how the dispensing of the feedstuff takes place, and also for explaining how the dispensing of water takes place in an alternative embodiment, reference is best made to FIGS. 3 and 4 which show in enlarged sectional elevation and respectively at right angles to each other, the interior of the passage formed by the sections 14 and 24.

As shown in FIG. 3, inside the passage there is a shelf plate 62 which is of shallow V-configuration and this plate extends from side to side of the passage and is fixed in position. It stops short of the other walls of the passage so as to define ledges 66 and 68. It lies centrally of the passage, and also in the passage and symmetrically arranged are deflector baffle plates 70 and 72. Each of these plates 70 and 72 is of U-shaped configuration, and it is mounted with the base screwed to the side wall of the passage in section 24. The legs are downwardly inclined as shown, and the upper leg is longer than the lower leg. In vertical direction, the upper leg overlaps the edge of the shelf plate 62.

The dibble bar 54 is mounted with its base rockable about axis 74 to an extent limited by the fork member 50 and the limit plate 56.

Hanging from the underside of the cross bar of the dibble rod is a deflector plate or vane 76 which stops short of the plate 62, but which sweeps over the plate in opposite directions as the dibble bar is rocked as indicated by the arrows 78. This has the effect of progressively displacing any feedstuff on the plate 62 towards and over the edges 68, 66 and out of the outlet 26.

Finally as shown in FIG. 4, the dibble bar arms 60 are inwardly turned as shown at 60A, and the base portion 90 of the dibble bar 54 carries stop discs 92 and 94 to prevent the dibble bar from moving excessively from a centralised position.

In a further embodiment, the dibble bar is provided with an upwardly extending actuator pin 80 which engages a shackle 82 of a valve assembly 84 which is provided in a water line 86.

The water line 86 extends downwardly through the passage and has an outlet 88 from which water can issue. The outlet 88 is located so that water issuing therefrom will drop into the tray 28 and moisten the feedstuff contained therein.

The principle of operation of the actuating pin 80 is that as the dibble bar is rocked, so the valve 84 is opened and closed and allows a metered amount of water to pass through pipe 86 and out of outlet 88.

In the arrangement shown, the pipe 86 is mounted as shown in FIG. 4 adjacent one of the side walls of the passage, and the actuating pin 80 is cranked to take account of the fact that the pipe is offset relative to the plane of operation of the dibble bar 54.

It is believed that operation of the apparatus will be understood from the description given above, but the modus operandi is briefly as follows:

The feedstuff is charged into the hopper as indicated by arrow 12 by any suitable feed mechanism so that the passage seems full, and the animals can obtain supply of feedstuff by operating the dibble bar (54) (they soon learn that operation of this bar causes delivery of feedstuff).

The feedstuff falls from the wide part of the hopper 10 into the passage made up of sections 14 and 24 and as the feedstuff falls through the passage, it encounters the longer legs 70A and 72A of the baffles 70, 72 and is deflected onto the shelf plate 62. The continued actuation of the dibble bar by the animals causes the collected feedstuff to be displaced progressively outwardly to the edges 66 and 68 and the feedstuff eventually falls over these edges and out through the open end of the passage and into the feed tray 28. If reference is made to FIG. 2, it will be seen that the fork member 50 controls the extent to which the dibble bar 54 can be rocked by the animals in that the lower ends of the arms of the member 50 are opposite the plate 56 and the plate will abut the arms as the dibble member is rocked allowing a greater or smaller angle of rocking of the dibble bar depending upon the position of the fork member 50.

In the moisture-adder embodiment, whilst the dibble bar is being rocked, it also operates the valve arrangement 82, 84 so that water is simultaneously supplied to the feedstuff in order to moisten same and render it more digestable especially to young piglets.

As the feedstuff, moistened or dry, drops into the centre of the feeding tray 28, a feeding pig pushes its snout under the obstructor bars 27 and 29 and the dibble bar 54 to access the dispensed feedstuff. The diameter of the feeding tray 28 is such that between one and six pigs can feed simultaneously, and when more than one pig is feeding at the feeding station, the pigs compete for the limited amount of feedstuff which is dispensed into the centre of the tray 28. Each pig can reach across the feeding tray 28 into the opposite pig's side and compete to consume the same portions of feedstuff.

This feature of competitive feeding is considered to be one of the principal factors for the substantial increase achieved using the present invention over the existing single-space feeders. A study of growth rates achieved using the two kinds of feeders yielded the following comparison.

Comparison of Growth Rates

| Batch No. | Av. Weight In | Av. Weight Selection | Days | Av. Daily Growth Rate |
|---|---|---|---|---|
| 1. Single space feeder. | | | | |
| Total number of pigs monitored = 389 | | | | |
| 1 | 35.9 kg | 83.6 kg | 60 | 800 gr/day |
| 2 | 31.75 kg | 66.1 kg | 46 | 743 gr/day |
| 3 | 25.75 kg | 68.9 kg | 55 | 786 gr/day |
| 4 | 46.75 kg | 79.3 kg | 42 | 786 gr/day |
| 5 | 40.00 kg | 66.6 kg | 38 | 699 gr/day |
| Overall average growth rate = 763 grams per day | | | | |
| 2. Competitive feeding station. | | | | |
| Total number of pigs monitored = 313 | | | | |
| 1 | 32.4 kg | 79.6 kg | 55 | 857 gr/day |
| 2 | 30.8 kg | 75.0 kg | 49 | 900 gr/day |
| 3 | 31.5 kg | 74.5 kg | 52 | 828 gr/day |
| 4 | 34.4 kg | 85.1 kg | 59 | 857 gr/day |
| Overall average growth rate = 861 grams per day. | | | | |

It can be seen from the above comparison that, even in the free-range feeding environment in which the feeding station of the invention is designed to be used, an average 12.7% growth rate advantage is achieved over the single-space feeder presently used.

A further feature of the invention to be discussed is the positioning of a framework immediately above the feeding tray 28. The obstructing bars 27 and 29 cooperate with the low outlet duct 24 and dibble bar 54 to obstruct the area immediately above the feeding tray 28. A feeding pig is thereby prevented from flicking or rooting feedstuff out of the feeding tray, and therefore not only does the feeding station of the present invention yield improved growth rates but also eliminates the wastage of feedstuff. Since feedstuff is only dispensed in limited amounts by a feeding pig as desired it is constantly presented fresh to the pigs and the feeding tray 28 is constantly cleaned by the pigs as they eat. This self-cleaning feature of the invention ensures that the pigs are supplied with feedstuff appetisingly and hygienically.

The provision of a planar framework which straddles the feeding trough ensures that effective support and obstructive/restrictive elements can be provided in the apparatus whilst allowing more than one animal to feed at each side of the apparatus, thereby contributing to the competitive nature of feeding occurring using the present invention.

Figure 5:
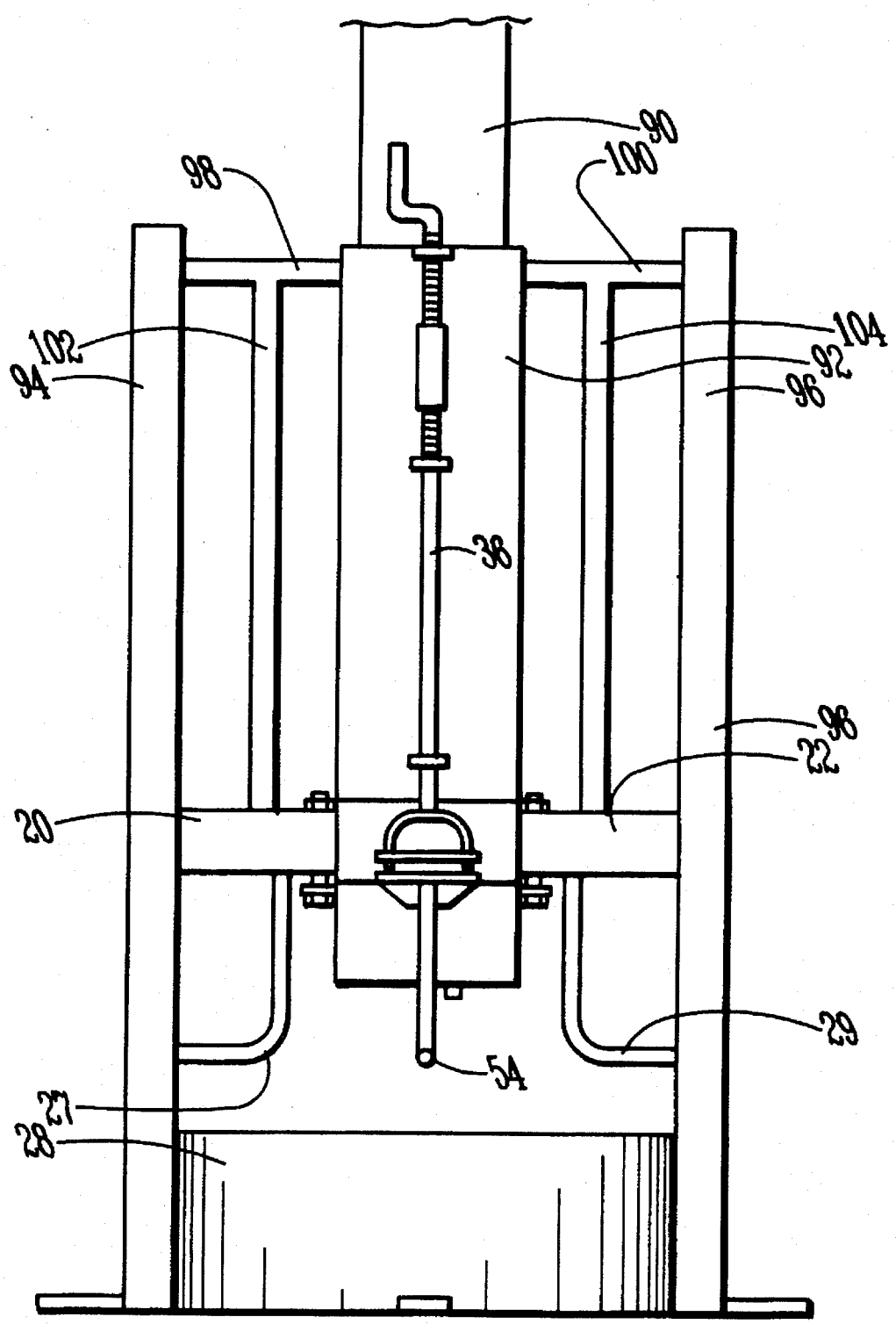
FIG. 5 is a side view of a further embodiment of pig feeder according to the invention.

The feeding apparatus of the present invention is an extremely cost-effective construction. The feeding apparatus described thus far is of a free standing arrangement, and therefore can be readily installed on a pig farm. In a further embodiment of the invention however, the invention may be utilised in an automated feed supply system, and a reference is made to FIG. 5 of the diagrams. An overhead feed supply supplies feed to vertical tube 90A, the supply being caused by intermittent rotation of a conveyor belt system. The feed passes down the supply tube 90A and into the intermediate supply tube 92A and the cross section of the supply tubes 90A and 92A is substantially constant throughout, to inhibit bridging of the feed stuff within the feed supply tubes 90A, 92A. In this embodiment, the framework comprises vertical supports 94A and 96A, top cross bars 98 and 100 and down bars 102 and 104. Other features of this automated feeding apparatus are similar to the features of the free standing feeding apparatus embodiment, to the exclusion of the hopper 18, as indicated by the use of corresponding numberings for the respective components in the diagrams.

Modifications of the invention may be made without departing from the scope of the invention. It is to be mentioned that the present invention is not restricted to the use of a dibble bar dispensing mechanism, as it is envisaged that the dispensing mechanisms will be altered to suit the type of feedstuff provided. The constant feature of the dispensing mechanism is that it is responsive to animal operation.

I claim:

1. An improved animal feeding apparatus comprising:

(a) an upright passage having a lower end and an outlet at the lower end from which foodstuff can fall;

(b) a feed tray for the feeding of animals having a center located under the outlet to catch foodstuff falling from the outlet, said feed tray being stationarily positioned beneath the outlet;

(c) a dispensing mechanism operable by the feeding animals for the dispensing of foodstuff from the outlet into the tray; and (d) a frame which supports the passage and locates the tray under the outlet so that animals can feed from the tray at opposite sides thereof;

the improvement comprising that the outlet is located sufficiently above the tray with unobstructed clearance between the outlet and the center of the tray to enable animals feeding at one side of the tray to reach across and to the center of the tray to feed from directly under the outlet in competition with the animals feeding at the opposite side of the tray.

2. Feeding apparatus according to claim 1, wherein the feed tray is a circular bowl.

3. Feeding apparatus according to claim 1, wherein a base of the feed tray is flat and undivided.

4. Feeding apparatus according to claim 1, wherein a said frame is of a generally planar construction.

5. Feeding apparatus according to claim 1, wherein the said frame is arranged in relation to the feed tray so that the area above the feed tray is restricted to inhibit rooting out of feedstuff from the tray.

6. A feeder according to claim 1, characterised in that the said dispensing mechanism is also adapted to operate a liquid supply means whereby a quantity of liquid to moisten the feedstuff is supplied to the feed tray along with the feedstuff.

7. A feeder according to claim 6, characterised in that there is a liquid feed pipe having an outlet above the feed tray and said pipe embodies a valve operatively connected to said dispensing mechanism to be operated thereby when rocked by an animal.

8. A feeding apparatus for animals comprising:

an upright feed passage having a lower end outlet;

a feed tray located to receive feedstuff falling from said outlet;

a feedstuff dispensing mechanism responsive to animal operation to dispense feed stuff from the passage onto the feed tray, said dispensing mechanism comprising a rockable member adapted upon rocking to displace accumulated feedstuff from a shelf in the passage over an edge of the shelf means to fall from the outlet, said shelf being fixed in the passage and extending from side to side thereof, the rockable member including a vane located above the shelf, further providing that the shelf comprises a shallow V-sectioned plate having two opposite edges and the vane is rockable by the animal to displace feedstuff to opposite sides of the shelf and over the opposite edges; and a frame which supports the upright passage and stationarily locates the feed tray to enable a number of animals radially arranged around the tray to feed simultaneously, the passage being positioned in relation to the feed tray so that feedstuff is dispensed into the center of the feed tray, characterized in that the apparatus provides a competitive feed tray sufficiently to enable any animal at the feeder to feed from under the outlet and also to reach across the feeding tray into the opposite side of the tray.

9. A feeder according to claim 8, characterised in that the feeder includes upper baffle means in the passage and above the shelf and arranged to direct feedstuff passing through the passage towards the shelf to be directed onto the shelf by said upper baffle means.

10. A feeder according to claim 8, characterized in that the feeder includes lower baffle means in the passage below the shelf edge on each edge for deflecting feedstuff falling from such edge towards the center of the passage to fall into the feed tray.

11. A feeder according ti claim 6, characterized in that the dispensing mechanism comprises an inverted U-shaped member of which the base passes through and is rockable relative to the passage and the arms hang freely outside the passage so as to be engageable by the animals.

12. A feeding apparatus for animals comprising:

an upright feed passage having a lower-end outlet, a feed tray located to receive feedstuff falling from said outlet;

a feedstuff dispensing mechanism responsive to animal operation to dispense feedstuff from the passage onto the feed tray; and a frame which supports the upright passage and stationarily locates the feed tray to enable a number of animals radially arranged around the tray to feed simultaneously, the passage being positioned in relation to the feed tray so that feedstuff is dispensed into the center of the feed tray, characterized in that the apparatus provides a competitive feeder by having the outlet located above the center of the feed tray sufficiently to enable any animal at the feeder to feed form under the outlet and also to reach across the feeding tray into the opposite side of the tray, wherein said frame is arranged in relation to the feed tray so that the area above the feed tray is restricted to inhibit rooting out of feedstuff from the tray, and further providing that the dispensing mechanism comprises animal operation means and check means are located in said frame adjacent the animal operation means.

13. A feeding apparatus according to claim 12, characterized in that said frame comprises two supports straddling the trays, and a cross bar, the check means being L-shaped bars each extending between one of said supports and the cross-bar.

* * * * *